(12) United States Patent
Krahn et al.

(10) Patent No.: US 9,641,641 B1
(45) Date of Patent: May 2, 2017

(54) TEMPORAL ADJUSTMENT OF IDENTIFIERS

(71) Applicant: Google Inc., Mountain View, CA (US)

(72) Inventors: Darren David Krahn, Saratoga, CA (US); Balázs Csaba Engedy, Munich (DE); Chiahsing Yu, Taipei (TW)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 14/257,836

(22) Filed: Apr. 21, 2014

(51) Int. Cl.
| | |
|---|---|
| *H04L 29/08* | (2006.01) |
| *H04L 9/32* | (2006.01) |
| *G06F 21/31* | (2013.01) |
| *H04L 29/06* | (2006.01) |

(52) U.S. Cl.
CPC .......... *H04L 67/303* (2013.01); *G06F 21/31* (2013.01); *G06F 2221/2137* (2013.01); *G06F 2221/2151* (2013.01); *H04L 9/3247* (2013.01); *H04L 63/10* (2013.01); *H04L 63/20* (2013.01)

(58) Field of Classification Search
CPC ..... H04W 12/04; H04W 12/02; H04W 12/08; H04W 8/26; H04W 60/00; H04L 63/061; H04L 63/0823; H04L 63/062; H04L 63/0442; H04L 9/0844; H04L 9/3247; H04L 63/0869; H04L 63/06; H04L 9/083; H04L 63/12; H04L 63/0853; H04L 9/08; H04L 67/14; H04L 9/0841; H04L 9/321; G06Q 20/1235; G06Q 2220/16; G06Q 20/3674; G06Q 20/0855; G06Q 20/32; G06F 21/10; G06F 2221/0737; G06F 2221/2151; G06F 2211/007; G06F 21/31; G06F 2221/2137; G06F 21/71; G06F 2221/2115; G06F 12/1408; G06F 21/725

USPC ....... 713/171, 168, 169, 150, 155, 156, 176; 709/227, 217, 206, 203, 245, 229, 224, 709/223, 219, 228; 726/27, 28, 26, 2, 4, 726/5, 6, 7, 21, 3, 14, 18, 19, 17

See application file for complete search history.

(56) References Cited

U.S. PATENT DOCUMENTS

| | | | |
|---|---|---|---|
| 6,539,092 B1 * | 3/2003 | Kocher | ................ G06Q 20/341 380/1 |
| 7,363,494 B2 * | 4/2008 | Brainard | ................ G06Q 20/32 380/232 |
| 7,376,624 B2 | 5/2008 | Cochran et al. | |
| 7,823,194 B2 | 10/2010 | Shay | |
| 7,826,380 B2 | 11/2010 | Ash et al. | |
| 7,900,245 B1 | 3/2011 | Geddes et al. | |
| 8,271,329 B2 | 9/2012 | Levine et al. | |
| 8,484,108 B2 | 7/2013 | Hunt et al. | |
| 8,560,669 B2 | 10/2013 | Sutter et al. | |

(Continued)

OTHER PUBLICATIONS

Famkruithof "How is a Time-based UUID / GUID made" Apr. 11, 2006 http://famkruithof.net/guid-uuid-timebased.html.*

*Primary Examiner* — Thomas Dailey
*Assistant Examiner* — Abderrahmen Chouat
(74) *Attorney, Agent, or Firm* — McDermott Will & Emery LLP (57) ABSTRACT

Aspects of the subject technology relate to systems and methods for providing temporally adjusted identifiers. A first identifier is received. A second identifier is determined based on time parameters and the first identifier. The time parameters include at least a period, where the period is a minimum duration of time prior to providing a computing device with a new identifier. The second identifier is provided for transmission to at least one computing device.

20 Claims, 4 Drawing Sheets

(56) References Cited

U.S. PATENT DOCUMENTS

| | | | |
|---|---|---|---|
| 8,655,318 B2* | 2/2014 | Zhou | H04W 60/00 380/232 |
| 2007/0220253 A1* | 9/2007 | Law | H04L 63/0838 713/168 |
| 2008/0136930 A1* | 6/2008 | Nagai | H04N 5/232 348/222.1 |
| 2013/0061036 A1* | 3/2013 | Oliver | G06F 21/73 713/150 |
| 2015/0079942 A1* | 3/2015 | Kostka | G06Q 30/0633 455/411 |

* cited by examiner

TEMPORAL ADJUSTMENT OF IDENTIFIERS

TECHNICAL FIELD

The present disclosure generally relates to computing platforms and, in particular, to temporal adjustment of identifiers.

BACKGROUND

An identifier can be used to identify an entity, such as an organization, a business, a computing device, a user of a computing device, and plural variants thereof, among others. The identifier can include, by way of example, numbers, letters, symbols, and combinations thereof. For example, an identifier for identifying a computer can include a sequence of bits or something represented by a sequence of bits, such as a character and/or numeric value. An identifier can be, for example, a social security number, driver's license number, business identification number, device serial number, randomly generated identification number (e.g., public key), among others. Identification of an entity can be utilized in content providing services, financial services, fraud detection, asset management, database indexing, statistical analysis, and so on.

SUMMARY

Aspects of the subject technology relate to a computer-implemented method for providing temporally adjusted identifiers. The method includes receiving, from a first computing device and by a second computing device, a first identifier. The method also includes determining a second identifier based on the first identifier, a period, and a first time value. The method also includes providing the second identifier for transmission. The period is a minimum duration of time prior to providing the first computing device with a new identifier.

Aspects of the subject technology also relate to a system for providing temporally adjusted identifiers. The system includes one or more processors and a non-transitory computer-readable medium comprising instructions stored therein, which, when processed by the one or more processors, cause the one or more processors to perform operations. The operations include receiving, from a first computing device, a first identifier. The operations also include determining a second identifier based on the first identifier, a period, and a first set of one or more clock values associated with the system. The operations also include providing the second identifier for transmission. The period is a minimum duration of time prior to providing the first computing device with a new identifier.

Aspects of the subject technology also relate to a non-transitory machine-readable medium including instructions stored therein, which when executed by a machine, cause the machine to perform operations. The operations include receiving, from a first computing device, a first identifier. The operations also include determining a second identifier based on the first identifier, a period, and a first time value. The operations also include providing the second identifier for transmission. The period is a minimum duration of time prior to providing the first computing device with a new identifier.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As previously indicated, an identifier can be used to identify an entity, such as an organization, a business, a computing device, a user of a computing device, and plural variants thereof, among others. The identifier can include, by way of example, numbers, letters, symbols, and combinations thereof. In some aspects, the identifier can be cryptographic data embedded in a hardware device, which acts as an identifier for the hardware device and is generally permanent (or otherwise difficult or inconvenient to change). In some aspects, the identifier can be a username for an email account that is associated with a user of the email account.

Identifier stability generally refers to how strongly bound an identifier is to the entity and how permanent the identifier is (or, conversely, how easily the identifier can be changed). For example, a perfectly stable identifier can be an identifier that is unique (no two entities have the same identifier), singular (no two identifiers refer to the same entity), and permanent (the identifier cannot be revoked or changed).

Concerns in regards to an entity's privacy motivate reduced identifier stability. Accordingly, while it may be useful for various services to be able to identify an entity, it is generally desirable for the entity to limit identification by the various services. Furthermore, it can be desirable for the entity to provide different identifiers to different services to reduce or prevent collusion by the different services. For example, different services can collude when an identifier provided by an entity to a particular service is also provided by the entity (either intentionally or inadvertently) to one or more other services. The identifier may be utilized by the different services to identify the entity, even if such identification is not known to and/or not desired by the entity. As an example for limiting identification, an identifier for the entity can have a limited duration, such that after the duration the identifier cannot be used to reliably identify the entity. Alternatively or in conjunction, as another example for limiting identification, an entity can assume multiple identities and can provide different identifiers to different services.

The subject technology provides systems and methods for temporal adjustment of identifiers. In one or more implementations, a network environment includes an entity, a requester, and an identity provider. The entity can initiate interaction with a service, where the service is provided by the requester. For example, the entity can transmit a request for the service. The requester can, in turn, request an identifier from the entity, such as prior to providing the entity with the service. In some aspects, the requester can request the entity for an identifier that is endorsed by a third party, such as the identity provider. Such endorsement by a third party may be utilized for fraud detection for example. In cases without such endorsement, an entity can provide, for example, an invalid identifier, fake identifier, or meaningless identifier to receive the service from the requester without the entity having provided an identifier that the requester can utilize to reliably identify the entity. As used herein, the requester is generally a service provider that requests an identifier (e.g., an endorsed identifier) from the entity and provides a service to the entity. The identity provider is generally a third party that is trusted by the entity and/or the requester.

The entity, requester, and identity provider can interact with each other via a network (e.g., the Internet). The entity can be, for example, a computing device or a user account utilized for accessing or interacting with a service provided by the requester. The requester can request an identifier from the entity (e.g., prior to providing service to the entity) with which the requester can use to identify the entity. An example of a service can be a content streaming service, such as a video or audio streaming service.

The identity provider can be a provider of a service that creates, maintains, and manages identity information. The identity provider can determine a temporally adjusted identifier based on time parameters (e.g., one or more clock values of the identity provider) and an identifier provided by the entity to the identity provider. The identity provider can transmit or provide for transmission the temporally adjusted identifier to the entity and/or the requester. The identifier provided by the entity to the identity provider is generally not disclosed to the requester.

In one or more implementations, an identifier provided by the entity to the identity provider can be adjusted over time, and a value of the adjusted identifier can be determined as a function of time. The temporal adjustment of identifiers can be utilized such that the identifiers retain identifier stability for an intended purpose, such as for fraud detection for a content streaming service, while reducing identifier stability to protect the entity from identification beyond the time needed for the intended purpose. Furthermore, the temporal adjustment of identifiers can be utilized to reduce or prevent identification of the entity by multiple services.

As an example, cryptographic data embedded in a hardware device can act as an identifier for the hardware device. It is generally desired that the cryptographic data not be disclosed to a requester or other devices/services, as the cryptographic data generally has a one-to-one binding with the hardware device. To reduce identifier stability of the cryptographic data embedded in the hardware device, the cryptographic data can be provided to an identity provider that can determine a temporally adjusted identifier based on the cryptographic data. The identity provider can map the cryptographic data to the temporally adjusted identifier in an irreversible manner such that knowledge of the temporally adjusted identifier is insufficient to arrive at the cryptographic data.

As used herein, the term "entity identifier" may refer to an identifier provided by the entity to the identity provider. The identity provider can generate a temporally adjusted identifier based on the entity identifier, where the temporally adjusted identifier can be provided for transmission by the identity provider. The temporally adjusted identifier can be transmitted by the identity provider to the entity for the entity to then forward to the requester. Alternatively or in conjunction, the temporally adjusted identifier can be transmitted by the identity provider directly to the requester.

In some aspects, an entity can have multiple identifiers that may co-exist at a given moment in time when interacting with a requester. For example, one entity (e.g., one computing device) can be running two sessions of a movie streaming service. A first session is associated with a first user and a second session is associated with a second user. Although the first and second sessions share the same entity, the first session corresponds to an identifier of the first user and the second session corresponds to an identifier of the second user. Each identifier can be associated with a different index value. For each user, the identifier associated with the user can be, by way of non-limiting example, a username of a respective user or a randomly generated identification that is associated with a respective user. Based on the first and second user's identifiers alone, the movie streaming service is generally unable to discern that the two sessions are from the same entity.

Figure 1:
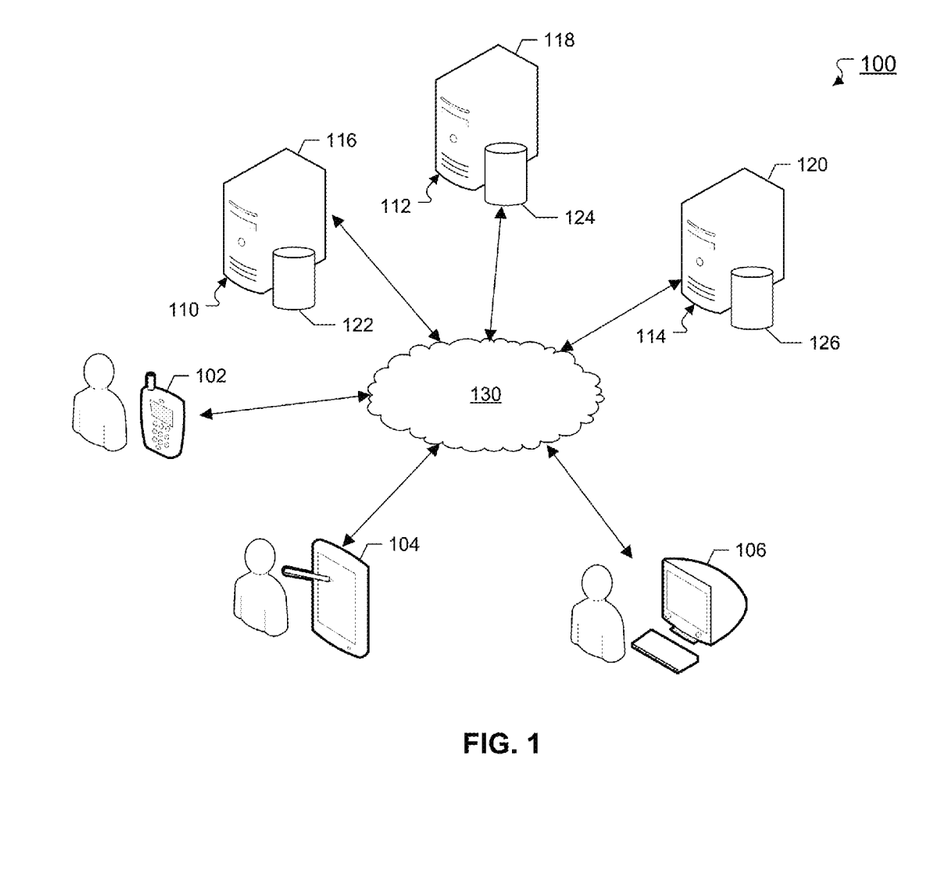
FIG. 1 illustrates an example network environment in which a temporally adjusted identifier can be provided.

FIG. 1 illustrates an example network environment 100 in which a temporally adjusted identifier can be provided. The network environment 100 includes computing devices 102, 104, and 106 (hereafter "102-106") and computing systems 110, 112, and 114 (hereafter "110-114"). Computing devices 102-106 and computing systems 110-114 can communicate with each other through a network 130. Each of computing systems 110-114 can include one or more computing devices 116, 118, and 120 (e.g., one or more servers) and one or more computer-readable storage devices 122, 124, and 126 (e.g., one or more databases). In some aspects, the network environment 100 can have more or fewer computing devices (e.g., 102-106) and/or computing systems (e.g., 110-114) than those shown in FIG. 1.

Each of the computing devices 102-106 can be associated with an entity that requests content from a provider of a service. The entity can be, for example, a device or an account associated with a user. Each entity can request a service (e.g., request data) from one or more requesters, and each entity can request one or more temporally adjusted identifiers from the identity provider.

The computing systems 110 and 112 can be a provider of a service. Each of the computing systems 110 and 112 can be configured as a requester that can request an identifier from a client device (e.g., computing device 102-106) that requests a service. For example, the computing system 110 can run a website that serves video content (e.g., video content stored in computer-readable storage device 122). To access the video content, each user of a computing device (e.g., 102) may need to provide an identifier (e.g., username, email, cryptographic data, etc.) to the computing system 110 via the website or other means.

The computing system 114 can be an identity provider that can determine a temporally adjusted identifier based on an entity identifier and time parameters. The entity identifier is generally not to be disclosed to the requester. The temporally adjusted identifier can be transmitted by the identity provider to the entity for the entity to then forward to the requester. Alternatively or in conjunction, the temporally adjusted identifier can be transmitted by the identity provider directly to the requester. In some aspects, the network environment 100 can have a different number of entities, requesters, and identity providers than that shown in FIG. 1. In some aspects, the network environment 100 can have multiple identity providers for example, where an entity can provide a first endorsed temporally adjusted identifier from one identity provider as an entity identifier to another identity provider in order to obtain a second endorsed temporally adjusted identifier.

By way of non-limiting example, services can include content providing services (e.g., video streaming services), financial services, fraud detection, asset management, database indexing, and statistical analysis. In some aspects, each of the computing systems 110 and 112 can provide one or more types of services to a client device (e.g., computing devices 102-106). In some aspects, the computing system 110 can provide different types of services from those provided by the computing system 112.

In one or more implementations, the identity provider endorses the temporally adjusted identifier, and proof of endorsement (e.g., a digital signature) is sent along with the temporally adjusted identifier from the identity provider to the entity (for forwarding to the requester) or directly from the identity provider to the requester. For example, in some cases, the requesters can request that an identifier from the entity be endorsed. The identity provider can be configured to endorse the temporally adjusted identifier at least in such cases.

Without endorsement, the entity may be able to provide an invalid identifier, fake identifier, or meaningless identifier to the requester. To obtain an endorsed identifier, the entity can contact the identity provider. In some aspects, the entity sends an entity identifier as well as other inputs to the identity provider, where the entity identifier provided to the identity provider is generally not disclosed to the requester. The other inputs provided to the identity provider, which will be discussed subsequently in the present disclosure, can include an identifier of the requester, which can be utilized to identify the requester with which the entity is interacting, an index value associated with the entity identifier provided to the identity provider, among other possible inputs. In some aspects, the entity can provide a stable identifier, such as a device serial number associated with the entity or cryptographic data embedded in the entity, to the identity provider.

The identity provider can take as an input the entity identifier and adjust the entity identifier to form a temporally adjusted identifier. The temporally adjusted identifier can be based on the entity identifier and other inputs from the entity as well as clock values of the identity provider, as will be subsequently discussed in the present disclosure. In one or more implementations, the identity provider can provide a digital signature. With the digital signature, the adjusted identifier can be considered an endorsed identifier. In one or more implementations, the entity can receive the endorsed identifier and the associated digital signature and can forward to the requester the endorsed identifier and the digital signature received from the identity provider. Alternatively or in conjunction, the identity provider can provide the endorsed identifier and the digital signature directly to the requester.

Each of computing devices 102-106 can represent various forms of processing devices. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

Each of the computing systems 110-114 may be any system or device having a processor, a memory, and communications capability for providing content (e.g., video content, temporally adjusted identifier) to the client devices 102-106. In some example aspects, any of computing systems 110-114 can be a single computing device (e.g., 116) such as, for example, a computer server. In other implementations, any of computing systems 110-114 can represent more than one computing device working together to perform the actions of a computer server (e.g., cluster of machines). Further, any of computing systems 110-114 can represent various forms of servers including, but not limited to, a web server, an application server, a proxy server, a network server, or a server farm.

In some aspects, the computing devices and systems, including 102-106 and 110-114, may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), Single-carrier Frequency Division Multiple Access (SC-FDMA), or Orthogonal FDMA (OFDMA), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks such as, for example, network 130. Network 130 can be a large computer network such as, for example, a local area network (LAN), wide area network (WAN), the Internet, a cellular network, or a combination thereof connecting any number of mobile clients, fixed clients, and servers. Further, the network 130 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., computing systems 110-114) can occur via a virtual private network (VPN), Secure Shell (SSH)

tunnel, or other secure network connection. In some aspects, network 130 may further include a corporate network (e.g., intranet) and one or more wireless access points.

Figure 2:
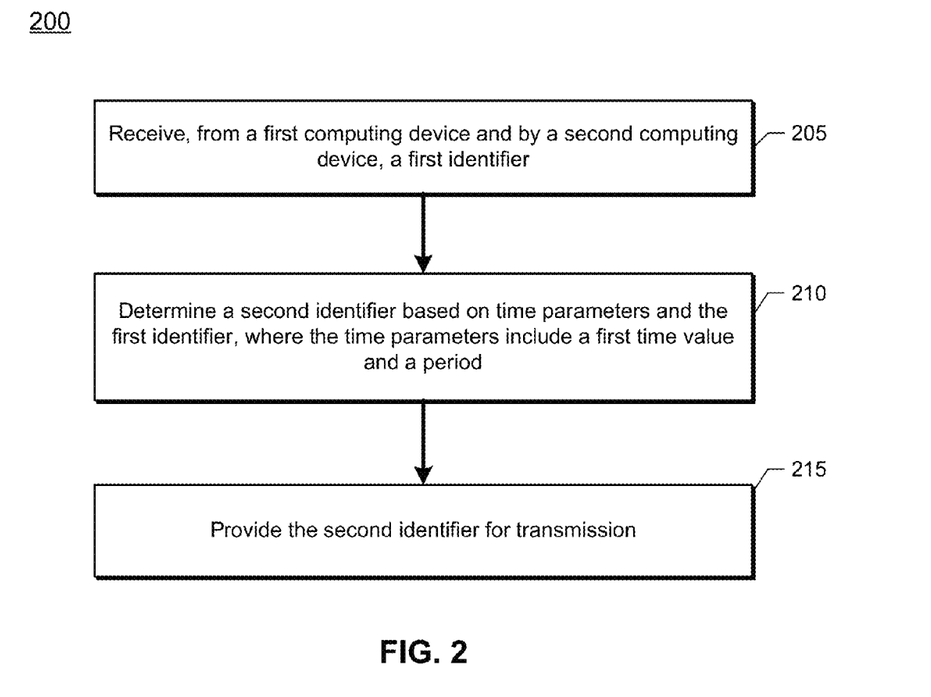
FIG. 2 shows a flowchart illustrating an example process for providing a temporally adjusted identifier, in accordance with various aspects of the subject technology.

FIG. 2 shows a flowchart illustrating an example process 200 for providing a temporally adjusted identifier, in accordance with various aspects of the subject technology.

As set forth in step 205 in FIG. 2, an entity identifier is received from a first computing device (e.g., computing device 102 in FIG. 1). The entity identifier can be received by a second computing device (e.g., computing device 120 of computing system 114 in FIG. 1). For example, an entity associated with the first computing device can provide the entity identifier to an identity provider associated with the second computing device. The entity identifier can be, by way of non-limiting example, a serial number of the first computing device, driver's license number of a user who is utilizing the first computing device, username for a particular website assessed by a user on the first computing device, cryptographic data associated with the first computing device, endorsed identifier from another identity provider (e.g., device factory), a combination thereof, and so forth. In some aspects, the entity identifier can be a stable identifier.

As set forth in step 210 in FIG. 2, the second computing device can determine a temporally adjusted identifier based on the entity identifier from the first computing device and time parameters.

In one or more implementations, the time parameters can include a first time value. The first time value can be associated with the second computing device. The first time value can be, or can be determined based on, a current time t. In some aspects, the current time t is from a clock on the second computing device (e.g., clock of the identity provider). The first time value can also be based on a time difference between the current time t and a reference time $t_{REF}$. The reference time $t_{REF}$ can be an earliest time value at which the first computing device established a connection with the second computing device for example, with the earliest time value being set based on a clock on the second computing device. As another example, the reference time $t_{REF}$ can be a predetermined time value set by the second computing device and independent of any activity by the first computing device. The current time t and the reference time $t_{REF}$ can be referred to as clock values of the second computing device.

In one or more implementations, the time parameters can also include a period T, which can be a minimum duration of time that is required prior to providing the first computing device with a new identifier. The new identifier can be considered as being provided to the entity (e.g., the first computing device associated with the entity) even when the new identifier is being provided by the identity provider directly to the requester (e.g., the entity does not see the new identifier), since the new identifier is set to be associated with the entity. The period T can be set by the identity provider.

For example, if a temporally adjusted identifier is provided to the first computing device at a time $t_1$ and a request for a new identifier is received from the first computing device at a time $t<t_1+T$ (i.e., before a period T has passed), the request from the first computing device can be ignored by the identity provider. By way of example, the first computing device can receive no reply from the second computing device regarding the request for a new identifier. Alternatively, the first computing device can receive an indication from the second computing device that the first computing device cannot be provided with a new identifier at the current time and/or the first computing device can be provided again with the temporarily adjusted identifier previously provided at time $t_1$.

Duration of a period is generally dependent on service with which an entity is requesting from a requester. In some aspects, the period is a constant value. An example duration of time for the period is one week. Another example duration of time for the period is one month. In some aspects, the period is not a constant value and can itself change over time. In such aspects, the minimum duration of time prior to providing a new identifier to the entity can change over time. For example, the period may decrease or increase monotonically as the difference between the current time t and the reference time $t_{REF}$ increases.

In one or more implementations, to determine the temporally adjusted identifier, a time-based value can be determined based on the time parameters. For example, the time-based value f(t) can be determined from the following Equation 1:

$$f(t) = \frac{(t - t_{REF})}{T} \quad \text{(Equation 1)}$$

where, as indicated above, t is the current time, $t_{REF}$ is the reference time, and T is the period. In some aspects, the integer component of f(t) is taken and utilized as the time-based value, such as by rounding or truncating the result of the division in Equation 1. The current time t and the reference time $t_{REF}$ can be referred to as clock values of the second computing device. The first time value can be, or can be determined based on, the time-based value.

The identity provider can then compute the temporally adjusted identifier by utilizing the first identifier and the time-based value in a one-way function. The one-way function can be configured to map an input identifier to an output identifier in a manner such that knowledge of the output identifier is insufficient to inverse map to the input identifier. In some aspects, the one-way function can be, for example, a message authentication code (MAC). The entity identifier can be utilized as a key and the time-based value can be utilized as a message to obtain the message authentication code. A keyed-hash message authentication code (HMAC) secure hash algorithm (SHA), such as HMAC-SHA256, can be utilized. A keyed hash, such as the HMAC-SHA256, can provide a one-way function so that the entity identifier and time parameter (e.g., t) are generally not derivable from a resulting temporally adjusted identifier. Message authentication codes aside from the HMAC-SHA256 can be utilized, such as cipher-based MAC (CMAC). Cryptographic hash functions such as the message-digest (MD) algorithm can also be utilized.

The temporally adjusted identifier can be, or can be based on, the message authentication code. The message authentication code can be emitted as the temporally adjusted identifier to be provided by the identity provider to the entity (e.g., for forwarding by the entity to the requester) or provided by the identity provider to the requester.

In one or more implementations, an entity can have a maximum number of temporally adjusted identifiers that may co-exist simultaneously per requester. This maximum number of temporally adjusted identifiers that may co-exist simultaneously per requester can be denoted as a maximum burst size $b_{MAX}$. The maximum burst size $b_{MAX}$ can be set by the requester or the identity provider and can be dependent on considerations such as cost, bandwidth, and convenience considerations. An example value of the maximum burst size $b_{MAX}$ is 10.

It may be useful for an entity to assume multiple concurrent identities (up to a maximum of $b_{MAX}$) when, for example, multiple users are using the same computing device to access a service from the same requester. For example, the entity can be a computing device on which numerous user accounts are logged in to access the content streaming service run by the requester.

In some aspects, one entity identifier can be utilized to determine up to $b_{MAX}$ number of temporally adjusted identifiers that may co-exist simultaneously per requester. Accordingly, the entity identifier can be associated with multiple index values. In such aspects, the second computing device can receive the entity identifier as well as an index value i from the first computing device, where i can be an integer value between 0 and $b_{MAX}-1$ for example. The second computing device can determine the temporally adjusted identifier further based on the index value i.

The number of possible temporally adjusted identifiers that can be output from the identity provider for a given entity interacting with a particular requester within a given time frame of N periods is given by $N+b_{MAX}-1$. For example, for a period T of 1 month and a maximum burst size $b_{MAX}$ of 3, the entity can assume no more than 14 identities in one year (N=12) for the particular requester.

To determine the temporally adjusted identifier, a first time-based value based on the time parameters, the index value, and the maximum burst size can be determined. For example, the first time-based value f(t) can be determined from the following Equation 2:

$$f(t) = \frac{(i \times T) + (t - t_{REF})}{b_{MAX} \times T} \qquad \text{(Equation 2)}$$

where, as indicated above, t is the current time, $t_{REF}$ is the reference time, T is the period, i is the index value, and $b_{MAX}$ is the maximum burst size. In some aspects, the integer component of f(t) is taken and utilized as the time-based value, such as by rounding or truncating the result of the division in Equation 2. The current time t and the reference time $t_{REF}$ can be referred to as clock values of the second computing device. Example values of the maximum burst size $b_{MAX}$ and the period T are 10 and 1 week, respectively.

A second time-based value can be determined based on some or all of a requester identifier, the index value, and the first time-based value. The requester identifier can be provided by the entity to the identity provider. In some aspects, the second time-based value can be a concatenation of the requester identifier, the index value, and the first time-based value. For a given entity identifier (and its corresponding burst index), the sending of a different requester identifier to the identity provider for each requester yields different second time-based values for each requester. The first time value can be, or can be determined based on, one or both of the first and second time-based values.

The identity provider can then compute the temporally adjusted identifier by utilizing the first identifier and the second time-based value in a one-way function. In some aspects, the one-way function can be, for example, a message authentication code that uses the entity identifier as the key and the second time-based value as the message. The message authentication code can be emitted as the temporally adjusted identifier to be provided by the identity provider to the entity (e.g., for forwarding by the entity to the requester) or provided by the identity provider to the requester. The temporally adjusted identifier can be, or can be based on, the message authentication code. A keyed hash, such as HMAC-SHA256, can provide a one-way function so that the entity identifier and various parameters (e.g., t, $t_{REF}$, i, $b_{MAX}$) are generally not derivable from a resulting temporally adjusted identifier. Message authentication codes aside from the HMAC-SHA256 can be utilized, such as cipher-based MAC (CMAC). Cryptographic hash functions such as the message-digest (MD) algorithm can also be utilized.

As set forth in step 215 in FIG. 2, the second computing device can provide the temporally adjusted identifier for transmission. In one or more implementations, the second computing device can provide the temporally adjusted identifier for transmission to the first computing device. The first computing device can forward the temporally adjusted identifier to a third computing device that is configured as a requester. In one or more implementations, the second computing device can also provide a signature (e.g., a digital signature) along with the temporally adjusted identifier for transmission to the first computing device and/or the third computing device.

Use of the requester identifier in the second time-based value can help reduce collusion of multiple requesters. For example, different services can collude when an identifier provided by an entity to a particular service is also provided by the entity (either intentionally or inadvertently) to one or more other services. The identifiers may be utilized by the different services to identify the entity, even when such identification is not known to and/or not desired by the entity.

Accordingly, in a case with one entity interacting with different requesters, different temporally adjusted identifiers can be provided to the different requesters, even when all the same parameters (e.g., t, $t_{REF}$, T, i, and $b_{MAX}$) and the same entity identifier are being utilized by the identity provider to determine temporally adjusted identifiers, since each temporally adjusted identifier is determined based in part on a different requester identifier. The resulting temporal adjusted identifiers are generally not correlated in value, and the different requesters generally cannot determine that the different identifiers are associated with a common entity (e.g., the same computing device).

In one or more implementations, the time-based value f(t) can be provided by a piecewise constant function of time. In one or more implementations, the temporally adjusted identifier can be provided by a function g(u, t), where u is the entity identifier and t is the time. The function g(u, t) can be a discrete-value function. In some aspects, the function g(u, t) is a one-way function. As provided above, one example of a one-way function utilizes a time-based value obtained from f(t) and a message authentication code such that g(u, t)=HMAC(u, f(t)).

Other examples of g(u, t) can also be utilized. As an example, a cipher like Advanced Encryption Standard Electronic Codebook (AES-ECB) can be utilized so that g(u, t)=AES-ECB(u, f(t)). As another example, a hash like g(u, t)=SHA-256(u||f(t)) can be utilized to map a value of u||f(t) to the temporally adjusted identifier g(u, t), where u||f(t) represents a concatenation of u and f(t). As another example, u||f(t) can be provided as a seed of the pseudorandom number generator PRNG, and an $M^{th}$ output of PRNG(u||f(t)) can be utilized as the temporally adjusted identifier, where M can be a predetermined integer value. Although concatenation is used as an example, other manners by which to combine value of u with value of f(t) can be utilized instead of u||f(t). For example, u and f(t) can be represented by a respective sequence of bits. Bits of one or both of u and f(t) can be scrambled. Alternative to or in conjunction with any scrambling, bits of u can be interspersed with bits of f(t).

Figure 3:
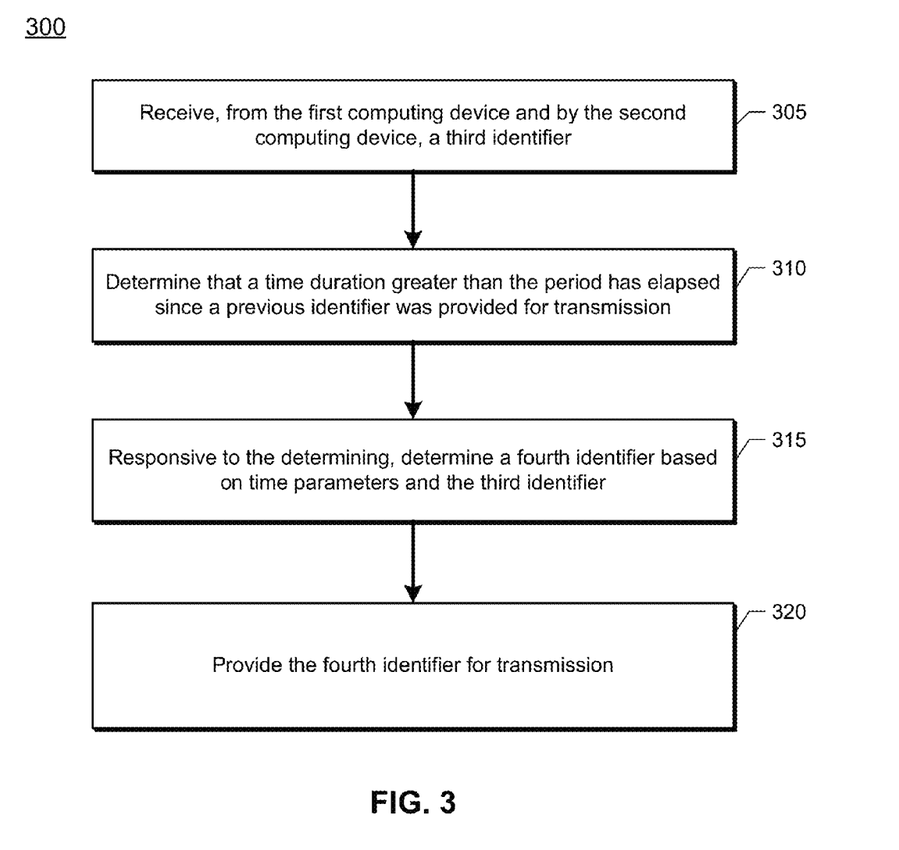
FIG. 3 is a flowchart illustrating an example process for providing a second temporally adjusted identifier, in accordance with various aspects of the subject technology.

FIG. 3 is a flowchart illustrating an example process 300 for providing a second temporally adjusted identifier, in accordance with various aspects of the subject technology. The steps of the process 300 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

As set forth in step 305 in FIG. 3, an entity identifier is received from the first computing device (e.g., computing device 102 in FIG. 1). The entity identifier can be received by a second computing device (e.g., computing device 120 of computing system 114 in FIG. 1). The identifier that is received from the first computing device can be the same identifier as the identifier provided in step 205 in FIG. 2. Alternatively, the identifier that is received from the first computing device can be a different identifier from the identifier provided in step 205 in FIG. 2.

As set forth in step 310 in FIG. 3, the second computing device can determine whether a time duration greater than the period has elapsed since a previous identifier (e.g., the temporally adjusted identifier provided in step 215 of FIG. 2) was provided for transmission.

As set forth in step 315 in FIG. 3, responsive to determining that a time duration greater than the period has elapsed since a previous identifier was provided for transmission, the second computing device can determine the second temporally adjusted identifier based on the identifier from the first computing device and time parameters. The determining of the second temporally adjusted identifier can be performed similar to the determining of the first temporally adjusted identifier, as discussed with reference to FIG. 2. For example, Equation 1 or 2 can be utilized to determine a time-based value, where the second temporally adjusted identifier can be based in part on the time-based value. As another example, Equation 1 or 2 can be utilized to determine a first time-based value, and, in turn, a second time-based value can be determined based on some or all of a requester identifier, an index value (among multiple index values) of the entity identifier, and the first time-based value. The time parameters can include a second time value, which can be, or can be determined based on, one or both of the first and second time-based values.

In a case where a time duration that is less than the period has elapsed since a previous identifier was provided for transmission, by way of example, the first computing device can receive no reply from the second computing device. Alternatively, the first computing device can receive an indication from the second computing device that the first computing device cannot be provided with a new identifier at the current time and/or the first computing device can be again provided with the previously provided temporally adjusted identifier.

As set forth in step 320 in FIG. 3, the second computing device can provide the second temporally adjusted identifier for transmission. In one or more implementations, the second computing device can provide the second temporally adjusted identifier for transmission to the first computing device. The first computing device can forward the second temporally adjusted identifier to a third computing device that is configured as a requester. In one or more implementations, the second computing device can also provide a signature (e.g., a digital signature) along with the second temporally adjusted identifier for transmission to the first computing device and/or the third computing device.

In one or more implementations, the process 300 shown in FIG. 3 can also be utilized to provide temporally adjusted identifiers subsequent to the second temporally adjusted identifier. For example, if an entity identifier is received from the first computing device and it is determined that a time duration greater than the period has elapsed since the second temporally adjusted identifier was provided for transmission, steps 315 and 320 can be followed to provide a third temporally adjusted identifier for transmission.

In accordance with aspects of the subject technology, authentication can be required at various points. In an application such as fraud detection, identifiers may be endorsed by a third party, because otherwise an entity can provide an invalid identifier. For example, the requester might need to authenticate that a time-adjusted identifier, such as when the temporally adjusted identifier from the identity provider is received by the entity and forwarded to the requester by the entity. In one or more implementations, signatures and/or certificates (e.g., electronic signatures/certificates) from one or more sources can be utilized.

In some aspects, an original issuer of a stable entity identifier can certify that the identifier is legitimate. In the case of a computing device with a serial number for example, the serial number could be signed/certified by an original manufacturer, and the signature/certificate can be supplied by the entity to the identity provider.

In some aspects, the identity provider may be required to certify that the identifier (e.g., temporally adjusted identifier) that the identity provider outputs is legitimate. For example, a requester may require that the identifier be certified. The identity provider can sign the identifier and emit both the identifier and the signature.

In some aspects, the requester may also want to verify that the entity is not submitting arbitrary requester identifier values to the identity provider, such as to bypass algorithm constraints. The requester identifier can be added to the identifier signature and emitted along with the requester identifier. For example, the tuple {ID, REQUESTER_ID, SIGNATURE(ID+REQUESTER_ID)} can be emitted back to the requester. By providing the tuple, the identity provider is indicating to the requester that the temporally adjusted identifier has been generated by the identity provider and is legitimate. Furthermore, by including the requester identifier in the tuple, the requester can verify that the entity is providing the correct requester identifier to the identity provider In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 4:
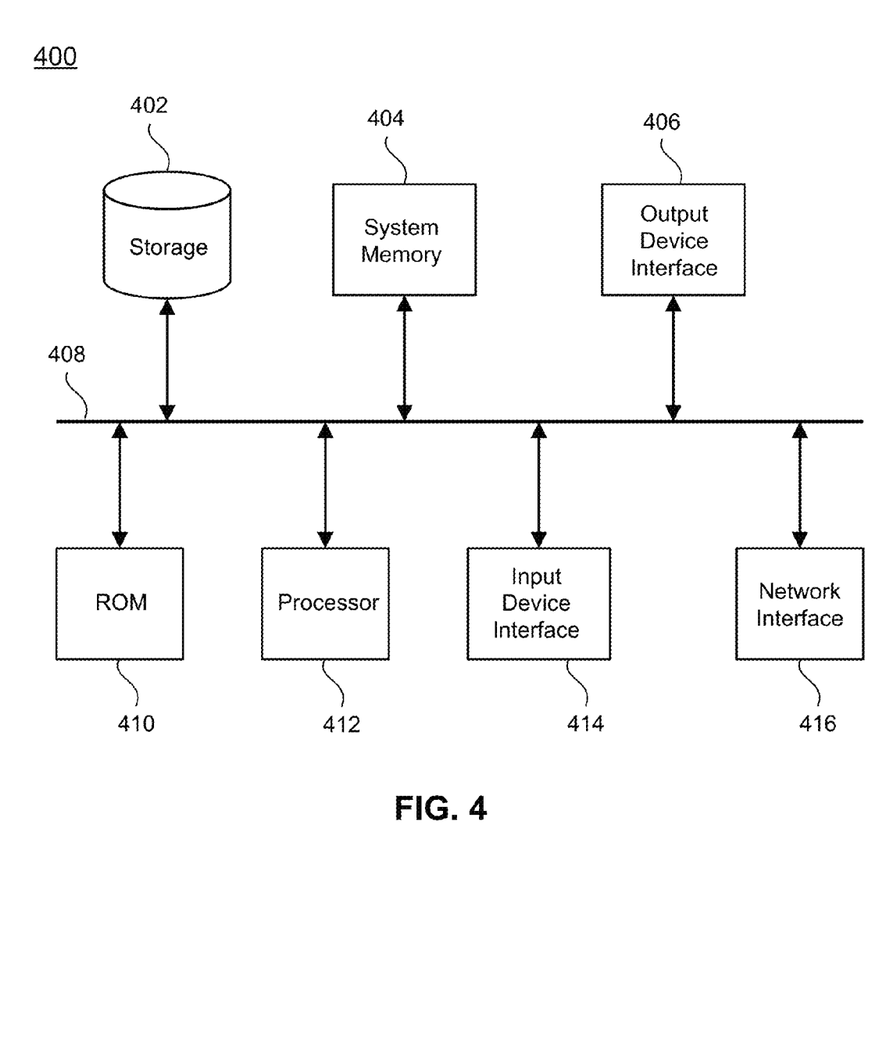
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, or ROM 410. For example, the various memory units include instructions for adjusting identifiers, in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network (LAN), a wide area network (WAN), or an Intranet, or a network of networks, for example, the Internet). Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computer-implemented method, comprising:
receiving, from a first computing device and by a second computing device, a first identifier of an entity, the entity being associated with the first computing device;
generating a first time value based on a calculation using and one or more time parameters and a predetermined period of time associated with the entity;
generating a second time value based on the first time value and a parameter associated with a service provider for the entity, the service provider being different than the entity;
generating, by the second computing device, a second identifier of the entity from a one-way function having a first input based on the received first identifier, and a second input based on the second time value;
providing the second identifier to the first computing device or a third computing device associated with the service provider for the entity;
certifying, for the third computing device associated with the service provider, that the second identifier is a legitimate identifier; and
generating a new identifier for the entity when the predetermined period of time is elapsed,
wherein the predetermined period of time is a minimum duration of time prior to providing a new identifier.

2. The method of claim 1, further comprising:
receiving, from the first computing device and by the second computing device, a third identifier;
determining whether a time duration greater than the predetermined period of time has elapsed since the second identifier was provided to the first computing device or the third computing device;
responsive to the determining that the time duration greater than the predetermined period of time has elapsed, generating a fourth identifier based on the third identifier, the predetermined period of time, and a third time value; and
providing the fourth identifier to the first computing device or the third computing device.

3. The method of claim 2, wherein the first identifier and the third identifier are the same.

4. The method of claim 1, wherein the first time value is based on one or more clock values associated with the second computing device.

5. The method of claim 1, wherein the generating comprises:
determining the first time value based on one or more clock values associated with the second computing device and the predetermined period of time; and
determining a message authentication code using the first identifier as a key and the second time value as a message, wherein the second identifier is the message authentication code.

6. The method of claim 1, further comprising receiving, from the first computing device and by the second computing device, an index value, wherein:
the first identifier is associated with a plurality of index values, the plurality of index values comprising the received index value, and
the generating the second identifier is further based on the received index value.

7. The method of claim 6, wherein the first time value is based on one or more clock values of the second computing device, the predetermined period of time, and the received index value.

8. The method of claim 6, wherein the generating comprises:
determining the second time value based on one or more clock values of the second computing device, the predetermined period of time, and the received index value; and
determining a message authentication code using the first identifier as a key and the second time value as a message, wherein the second identifier is the message authentication code.

9. The method of claim 1, further comprising receiving a requester identifier associated with a requester device, the requester device being configured to receive the second identifier, wherein the generating the second identifier is further based on the requester identifier.

10. The method of claim 9, wherein the providing the second identifier comprises providing the second identifier from the second computing device to the requester device.

11. The method of claim 1, wherein the second identifier is provided to the first computing device.

12. A system, comprising:
one or more processors; and
a non-transitory computer-readable medium comprising instructions stored therein, which when executed by the one or more processors, cause the one or more processors to perform operations comprising:
receiving, from a first computing device, a first identifier of an entity, the entity being associated with the first computing device;
generating a first time value based on a calculation using and one or more time parameters and a predetermined period of time associated with the entity, at least one of the one or more time parameters being based a first set of one or more clock values associated with the system;
generating a second time value based on the first time value and a parameter associated with a service provider for the entity, the service provider being different than the entity;
generating a second identifier of the entity from a one-way function having a first input based on the first identifier, and a second input based on the second time value;

providing the second identifier to the first computing device or a second computing device associated with the service provider for the entity;

certifying, for the second computing device associated with the service provider, that the second identifier is a legitimate identifier; and generating a new identifier for the entity when the predetermined period of time is elapsed, wherein the predetermined period of time is a minimum duration of time prior to providing the first computing device with a new identifier.

13. The system of claim 12, wherein the instructions, when executed by the one or more processors, cause the one or more processors to perform operations further comprising:

receiving, from the first computing device, a third identifier;

determining whether a time duration greater than the predetermined period of time has elapsed since the second identifier was provided to the first computing device or the s computing device;

responsive to the determining that the time duration greater than the predetermined period of time has elapsed, generating a fourth identifier based on the third identifier, the predetermined period of time, and a second set of one or more clock values; and providing the fourth identifier to the first computing device or the second computing device.

14. The system of claim 12, the first set of one or more clock values comprising at least a first clock value and a second clock value, wherein the first time value is based on the predetermined period of time and a difference between the first clock value and the second clock value.

15. The system of claim 12, wherein the instructions, when executed by the one or more processors, cause the one or more processors to perform operations further comprising receiving, from the first computing device, an index value, and wherein:

the first identifier is associated with a plurality of index values, the plurality of index values comprising the received index value, and the generating the second identifier is further based on the received index value.

16. The system of claim 12, wherein the parameter associated with the service provider is a requester identifier associated with the second computing device, and wherein the instructions, when executed by the one or more processors, cause the one or more processors to perform operations further comprising:

receiving, from the first computing device, the requester identifier.

17. A non-transitory machine-readable medium comprising instructions stored therein, which when executed by a machine, cause the machine to perform operations comprising:

receiving, from a first computing device, a first identifier of an entity, the entity being associated with the first computing device;

generating a first time value based on a calculation using and one or more time parameters and a predetermined period of time associated with the entity;

generating a second time value based on the first time value and a parameter associated with a service provider for the entity, the service provider being different than the entity;

generating a second identifier of the entity from a one-way function having a first input based on the first identifier, and a second input based on the second time value;

providing the second identifier to the first computing device or a second computing device associated with the service provider for the entity;

certifying, for the second computing device associated with the service provider, that the second identifier is a legitimate identifier; and generating a new identifier for the entity when the predetermined period of time is elapsed, wherein the predetermined period of time is a minimum duration of time prior to providing the first computing device with a new identifier.

18. The non-transitory machine-readable medium of claim 17, wherein the instructions, when executed by one or more processors, cause the one or more processors to perform operations further comprising:

receiving, from the first computing device, a third identifier;

determining whether a time duration greater than the predetermined period of time has elapsed since the second identifier was provided to the first computing device or the second computing device;

responsive to the determining whether a time duration greater than the predetermined period of time has elapsed since the second identifier was provided, generating a fourth identifier based on the third identifier, the predetermined period of time, and a third time value; and providing the fourth identifier to the first computing device or the second computing device.

19. The non-transitory machine-readable medium of claim 17, wherein the instructions, when executed by one or more processors, cause the one or more processors to perform operations further comprising receiving, from the first computing device, an index value, and wherein:

the first identifier is associated with a plurality of index values, the plurality of index values comprising the received index value, and the generating the second identifier is further based on the received index value.

20. The non-transitory machine-readable medium of claim 17, wherein the parameter associated with the service provider is a requester identifier associated with the second computing device, and wherein the instructions, when executed by one or more processors, cause the one or more processors to perform operations further comprising:

receiving, from the first computing device, the requester identifier.

* * * * *

UNITED STATES PATENT AND TRADEMARK OFFICE
CERTIFICATE OF CORRECTION

PATENT NO. : 9,641,641 B1
APPLICATION NO. : 14/257836
DATED : May 2, 2017
INVENTOR(S) : Darren David Krahn et al.

Page 1 of 1

It is certified that error appears in the above-identified patent and that said Letters Patent is hereby corrected as shown below:

In the Claims

Claim 1, Column 17, Line 32, "and one or more" should read --one or more--.

Claim 12, Column 18, Line 55, "using and one or more" should read --using one or more--.

Claim 13, Column 19, Line 22, "the s computing" should read --the second computing--.

Claim 17, Column 20, Line 2, "and one or more" should read --one or more--.

Signed and Sealed this
First Day of October, 2019

Andrei Iancu
*Director of the United States Patent and Trademark Office*